United States Patent [19]

Bonnaud

[11] Patent Number: 4,513,572

[45] Date of Patent: Apr. 30, 1985

[54] METHOD OF RECOVERING ENERGY IN A POWER GENERATOR AND POWER GENERATOR FOR CARRYING OUT THE SAID METHOD

[75] Inventor: Pierre L. Bonnaud, Carrieres sur Seine, France

[73] Assignee: Societe d'Etudes de Machines Thermiques, S.E.M.T., Carrieres sur Seine, France

[21] Appl. No.: 479,995

[22] Filed: Mar. 29, 1983

[30] Foreign Application Priority Data

Apr. 12, 1982 [FR] France .................................. 82 05800

[51] Int. Cl.³ .............................................. F01K 23/10
[52] U.S. Cl. ..................................................... 60/618
[58] Field of Search ...................... 60/606, 618, 39.182

[56] References Cited

U.S. PATENT DOCUMENTS

| | | | |
|---|---|---|---|
| 2,159,758 | 5/1939 | Diedrich | 60/618 X |
| 4,334,409 | 6/1982 | Daugas | 60/618 |
| 4,404,805 | 9/1983 | Curtil | 60/606 |

FOREIGN PATENT DOCUMENTS 0038232 10/1981 European Pat. Off. .
2743149 4/1979 Fed. Rep. of Germany .
2838490 2/1980 Fed. Rep. of Germany .
2353715 12/1977 France .

*Primary Examiner*—Michael Koczo
*Attorney, Agent, or Firm*—Kenyon & Kenyon

[57] ABSTRACT

A turbocharged internal combustion engine includes a supercharging air compressor that delivers compressed air to the engine via a compressed air delivery conduit, the compressor being coupled to an exhaust gas turbine having an inlet connected to the exhaust manifold of the engine via an exhaust gas conduit and an outlet, a bypass conduit connecting the compressed air delivery conduit to the exhaust gas conduit, and is characterized by an energy recovery device comprising an auxiliary vapor generator having a heating fluid side with an inlet connected to the outlet of the exhaust gas turbine and having a heated fluid side with an outlet connected to an inlet of an auxiliary vapor turbine via an auxiliary vapor conduit, and a heat exchanger traversed by the bypass conduit and inserted in the auxiliary vapor conduit for preheating the bypassed compressed air by excess heat of the auxiliary vapor prior to delivering the auxiliary vapor to the auxiliary vapor turbine.

5 Claims, 1 Drawing Figure

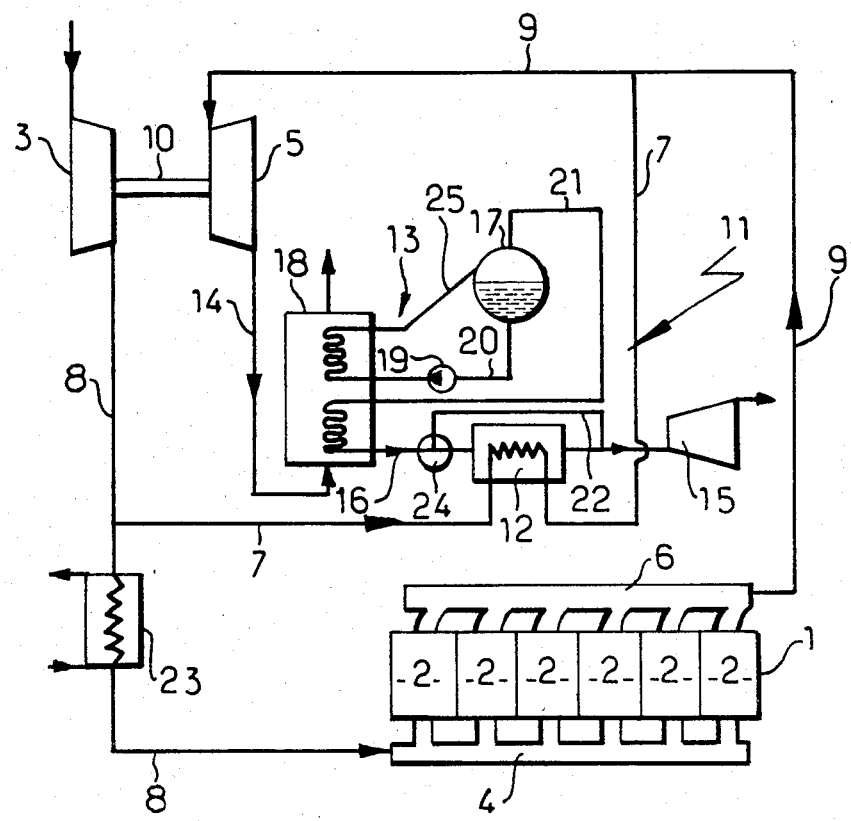

METHOD OF RECOVERING ENERGY IN A POWER GENERATOR AND POWER GENERATOR FOR CARRYING OUT THE SAID METHOD

The present invention has for a subject matter a method of recovering energy from a turbocharged internal combustion engine, notably a diesel engine, having a supercharging air compressor with an outlet connected to the intake manifold of the engine and coupled to an exhaust gas turbine having an inlet and an outlet, the inlet being connected to the exhaust manifold of the engine. The present invention also relates to apparatus for carrying out the method according to the invention.

In an internal combustion engine of the type mentioned above, an auxiliary fluid vapour generator in which fluid is heated by the exhaust gases from the outlet of the turbine driving the supercharging air compressor can be used to recover lost heat of the engine, the generator being used particularly at the heavier engine loads.

In a system of the same type, moreover, a bypass flow is drawn from the total compressed air flow otherwise delivered by the compressor to the engine and is added to the exhaust gases before the exit of the gases from the exhaust gas turbine, and a heater can be used to heat directly the bypass flow by the exhaust gases of the turbine, which heater can be used particularly at low engine loads.

However, the latter system suffers from the drawback that it causes a pressure drop in the engine exhaust circuit, which is prejudicial to the performance of the engine and more particularly to its efficiency. Moreover, such an arrangement makes it difficult, if not impossible, to use a conventional auxiliary vapour generator, due to the fact that a large portion of the energy of the gases is consumed in the compressed air heater.

The present invention has for a purpose to obviate the aforementioned drawbacks by providing a method of recovering energy from a turbocharged internal combustion engine, notably a diesel engine including a supercharging air compressor having an outlet connected to the intake manifold of the engine and coupled to an exhaust gas turbine having an inlet and an outlet, the inlet being connected to the exhaust manifold of the engine, a bypass flow being tapped off from the total flow of a compressed air otherwise delivered by the compressor to the engine and being added to the exhaust gases before the exit of the gases from the exhaust gas turbine, characterized in that the gases issuing from the exhaust gas turbine heat a fluid in an auxiliary fluid vapour generator having an outlet connected to an auxiliary vapour turbine, the auxiliary fluid vapour thus produced heating the bypass flow before the vapour enters the auxiliary vapour turbine, whereas at the higher engine loads, the auxiliary fluid vapour enters the auxiliary vapour turbine directly, the limit between the engine lower loads and higher loads being for example equal to 50% of the maximum engine load.

The present invention also relates to apparatus for carrying out the aforementioned method comprising an internal combustion engine, notably a diesel engine including a supercharging air compressor having an outlet connected via a compressed air delivery conduit to the intake manifold of the engine and coupled to an exhaust gas turbine having an inlet and an outlet, the inlet being connected via an exhaust gas delivery conduit to the exhaust manifold of the engine, a bypass conduit connecting the compressor compressed air delivery conduit to the exhaust gas delivery conduit, and an energy recovery device, characterized in that the energy recovery device comprises an auxiliary fluid vapour generator having a heating fluid side with an inlet and an outlet and a heated fluid side with an inlet and an outlet, the inlet of the heating fluid side being connected to the turbine gas outlet, and the outlet of the heated fluid side being connected via an auxiliary vapour conduit to an inlet of an auxiliary vapour turbine, and a heat exchanger having a heated fluid side inserted into said bypass conduit and a heating fluid side which is inserted in the auxiliary vapour conduit connecting the outlet of the heated fluid side of said auxiliary vapour generator to the inlet of the auxiliary vapour turbine.

According to another characterizing feature of the invention, a second bypass conduit is connected to said auxiliary vapour conduit upstream and downstream of said heat exchanger, and a three-way valve is provided at the intersection of the second bypass conduit with the auxiliary vapour conduit upstream of said heat exchanger.

The invention will be better understood, and other purposes, characterizing features, details and advantages thereof will appear more clearly as the following explanatory description proceeds with reference to the appended diagrammatic drawing given solely by way of non-limitative example, wherein the single FIGURE is a functional block diagram illustrating a specific, presently preferred form of embodiment of the invention.

The apparatus shown in the single FIGURE comprises a diesel engine with six cylinders 2, a supercharging air compressor 3 having an outlet connected to the intake manifold 4 of the engine and coupled by a shaft 10 to an exhaust gas turbine 5 having an inlet and an outlet, the inlet being connected to the exhaust manifold 6 of the engine. A first bypass conduit 7 connects the compressed air delivery conduit 8 of the compressor 3 to the exhaust gas delivery conduit 9. The first bypass conduit 7 is connected to the compressed air delivery conduit 8 at a point preferably upstream of a compressed air cooler 23.

An energy recovery device 11 according to the invention comprises an auxiliary fluid vapour generator 13 (the auxiliary fluid being for example water) having a auxiliary fluid side with an inlet and an outlet and a heated fluid side with an inlet and an outlet, the inlet of the heating fluid side being connected, on the upstream or heating fluid side, to the turbine outlet through a conduit 14, and the outlet of the heated fluid side being connected to an inlet of an auxiliary vapour turbine 15 through an auxiliary vapour conduit 16.

The auxiliary fluid vapour generator 13 consists for example of a fluid drum 17 suppled with liquid auxiliary fluid from a boiler 18 through a conduit 20 in which is preferably inserted a pump 19, a return conduit 25 being provided to return the vapourized auxiliary fluid to the drum 17, whereas another conduit 21 supplies vapour from the drum 17 to the conduit 16 connecting the outlet of the heated fluid side of the vapour generator to the inlet of the auxiliary vapour turbine 15, preferably by passing the conduit 21 through the boiler 18.

The energy recovery device 11 according to the invention also comprises a heat exchanger 12 having a heated fluid side inserted into the first bypass conduit 7 and a heating fluid side which is inserted in the auxiliary vapour conduit 16 connecting the outlet of the heated fluid side of the auxiliary vapour generator 13 to the inlet of the auxiliary vapour turbine 15.

Thus, in a turbocharged internal combustion engine of this type, wherein a bypass flow is drawn from the total compressed air flow otherwise delivered by the compressor 3 to the engine 1 and is added to the exhaust gases before the exit of the gases from the exhaust gas turbine 5, the gases issuing from the exhaust gas turbine 5 heat the auxiliary fluid in the auxiliary fluid vapour generator 13, the heated fluid outlet of which is connected to the inlet of the auxiliary vapour turbine 15. The auxiliary fluid vapour produced in the auxiliary fluid vapour generator 13 then heats the bypass flow of compressed air before this vapour enters the auxiliary vapour turbine 15.

A second bypass conduit 22 may advantageously be connected to the auxiliary vapour conduit 16, upstream and downstream of the heat exchanger 12, and there may be provided a three-way valve 24 at the upstream end of the second bypass conduit 22 so as to open the second bypass conduit by closing the main conduit 16 running through the heat exchanger 12, and vice versa. Thus, at lower engine loads, the auxiliary fluid vapour heats the bypass flow of compressed air before the auxiliary fluid vapour enters the auxiliary vapour turbine 15 (the second bypass conduit 22 then being closed), whereas at higher engine loads, the auxiliary vapour enters directly into the auxiliary vapour turbine 15 (the second bypass conduit 22 then being open while the main conduit 16 traversing the heat exchanger 12 is closed). The limit between the lower and higher engine loads is for example equal to 50% of the maximum engine load.

What is claimed is:

1. A method for recovering energy from exhaust gases discharged from an exhaust manifold of a turbocharged internal combustion engine, the method including delivering a flow of exhaust gases from the exhaust manifold of the engine to an inlet of an exhaust gas turbine, exiting a flow of the exhaust gases from an outlet of the exhaust gas turbine, driving a supercharging air compressor by the exhaust gas turbine, delivering a flow of compressed air from an outlet of the supercharging air compressor to an intake manifold of the engine, withdrawing a portion of the total flow of compressed air from the outlet of the compressor, and introducing the withdrawn portion of the flow of compressed air into the flow of exhaust gases before exit of the exhaust gases from the outlet of the exhaust gas turbine, wherein the improvement comprises:
   passing the exhaust gases, after their exit from the outlet of the exhaust gas turbine, through an auxiliary fluid vapor generator in heat exchanging relation to an auxiliary fluid in said vapor generator;
   delivering a flow of vaporized auxiliary fluid from an auxiliary fluid outlet of the auxiliary fluid vapor generator;
   passing said flow of vaporized auxiliary fluid in heat exchanging relation to the withdrawn portion of the flow of compressed air during at least low load operation of the engine for heating said withdrawn portion of the flow of compressed air before the latter is introduced into the flow of exhaust gases; and
   then delivering said flow of vaporized auxiliary fluid to an inlet of an auxiliary vapor turbine.

2. A method according to claim 1, wherein the method further comprises delivering said flow of vaporized auxilliary fluid from the auxiliary fluid outlet of the auxiliary fluid vapor generator directly to the inlet of the auxiliary vapor turbine when the engine is operating under high load conditions.

3. A method according to claim 2 wherein the transition between low load and high load engine operating conditions is selected to be equal to 50% of the maximum engine load.

4. Apparatus for recovering energy from exhaust gases discharged from an exhaust manifold of a supercharged internal combustion engine including a supercharging air compressor having an outlet connected to an intake manifold of the engine, an exhaust gas turbine drivingly coupled to the supercharging air compressor, the exhaust gas turbine having an inlet connected to the exhaust manifold of the engine and an outlet, a bypass passage connected from the outlet of the supercharing air compressor to the exhaust gas turbine upstream of the outlet of said turbine for withdrawing a portion of the flow of compressed air from the supercharging air compressor and introducing said withdrawn portion into the flow of exhaust gases, and an energy recovery device having an exhaust gas inlet connected to the outlet of the exhaust gas turbine, wherein the improvement comprises:
   said energy recovery device comprises an auxiliary fluid vapor generator having an exhaust gas side disposed in heat transferring relation to an auxiliary fluid side, said exhaust gas inlet of the energy recovering device communicating directly with the exhaust gas side, said auxiliary fluid side of the vapor generator having an auxiliary fluid inlet, for connection to a source of auxiliary fluid, and an auxiliary fluid vapor outlet;
   an auxiliary vapor turbine having an inlet coupled to the auxiliary fluid vapor outlet of the auxiliary fluid vapor generator via an auxiliary fluid conduit; and
   a heat exchanger having a heating fluid side inserted in the auxiliary fluid conduit and a heated fluid side inserted in said bypass passage, for transferring heat from a flow of vaporized auxiliary fluid to the withdrawn portion of the flow of compressed air before delivery of the vaporized auxiliary fluid to the inlet of the auxiliary vapor turbine.

5. Apparatus according to claim 4, the apparatus further comprising:
   a three-way valve inserted in said auxiliary vapor conduit, the valve having an inlet connected to the auxiliary fluid vapor outlet of the auxiliary fluid vapor generator, a first outlet connected to an inlet of the heating fluid side of said heat exchanger, and a second outlet connected via an auxiliary vapor bypass conduit to an outlet of the heating fluid side of the heat exchanger, said valve being actuable between a first position communicating the inlet of the valve with the first outlet thereof and a second position communicating the inlet of the valve with the second outlet thereof.

* * * * *